(12) United States Patent
Nada et al.

(10) Patent No.: US 7,241,083 B2
(45) Date of Patent: Jul. 10, 2007

(54) THREAD CUTTING INSERT

(75) Inventors: Yutaka Nada, Ibaraki-ken (JP); Osamu Ichinoseki, Ibaraki-ken (JP)

(73) Assignee: Mitsubishi Materials Corporation, Chiyoda-Ku, Tokyo (JP)

( * ) Notice: Subject to any disclaimer, the term of this patent is extended or adjusted under 35 U.S.C. 154(b) by 212 days.

(21) Appl. No.: 11/258,404

(22) Filed: Oct. 24, 2005

(65) Prior Publication Data

US 2006/0088391 A1    Apr. 27, 2006

(30) Foreign Application Priority Data

Oct. 27, 2004    (JP)    .............................. 2004-312241

(51) Int. Cl.
B23B 27/22    (2006.01)
(52) U.S. Cl. ...................... 407/114; 407/115; 407/116; 407/113
(58) Field of Classification Search ................ 407/113, 407/114, 115, 116
See application file for complete search history.

(56) References Cited

U.S. PATENT DOCUMENTS

| | | | |
|---|---|---|---|
| 4,575,888 A | 3/1986 | Muren | |
| 4,673,924 A | 6/1987 | Taylor | |
| 4,674,924 A * | 6/1987 | Carlsson et al. | ............. 407/114 |
| 4,993,892 A * | 2/1991 | Takahashi | .................... 407/114 |
| 5,765,972 A | 6/1998 | Ericksson et al. | |
| 5,810,518 A * | 9/1998 | Wiman et al. | .............. 407/102 |
| 6,293,738 B1 * | 9/2001 | Hartlohner et al. | ......... 407/114 |

FOREIGN PATENT DOCUMENTS

| | | |
|---|---|---|
| JP | 9-502396 A | 3/1997 |
| JP | 2001-514089 A | 9/2001 |
| WO | WO-95/07159 A1 | 3/1995 |
| WO | WO-99/11416 A1 | 3/1999 |

OTHER PUBLICATIONS

Patent Abstracts of Japan for JP08-257837 published Oct. 8, 1996.
Patent Abstracts of Japan for JP08-294804 published Nov. 12, 1996.

* cited by examiner

*Primary Examiner*—Willmon Fridie, Jr.
(74) *Attorney, Agent, or Firm*—Darby & Darby

(57) ABSTRACT

A thread cutting insert includes main cutting edges that have a pair of thread cutting edges and wiper thread cutting edges for full profile on side edges of a rake face formed on the insert body respectively. The pair of thread cutting edges is formed in a convex V shape as viewed in a plane facing the rake face, and the wiper thread cutting edges for full profile are connected to posterior ends of the thread cutting edges. An inner portion of a V-shaped projection of the rake face, which is formed on the front side of the wiper thread cutting edge for full profile by the pair of thread cutting edges, is formed not to protrude from the thread cutting edges as viewed in the plane. A first convex protrusion projecting from the rake face, a second convex protrusion higher than the first convex protrusion, and the third convex protrusion higher than the first and second convex protrusions project on the rear side of the wiper thread cutting edge for full profile of the rake face as viewed in the plane, and the first and second convex protrusions are positioned closer to the main cutting edge than the third convex protrusions.

9 Claims, 7 Drawing Sheets

THREAD CUTTING INSERT

INCORPORATION BY REFERENCE

The present application claims priority under 35 U.S.C. §119 to Japanese Patent Application No. 2004-312241 filed on Oct. 27, 2004. The content of the application is incorporated herein by reference in its entirety.

BACKGROUND OF THE INVENTION

1. Field of the Invention

The present invention relates to a thread cutting insert that is held on a tool body of an insert detachable type cutting tool to perform a thread cutting on a work.

2. Description of the Related Art

As this kind of thread cutting insert, various cutting inserts are suggested in JP-A-8-257837, JP-A-8-294804, JP-T-9-502396, and JP-T-2001-514089. In the various cutting inserts, a rake face is formed at each of corner portions of a triangular surface of an insert body that is formed in a triangular flat plate shape, and a pair of thread cutting edges formed in a convex V shape corresponding to a cross-section of a thread to be cut is formed on side edges of the rake face as viewed in a plane facing the rake face. Also, the inserts disclosed in JP-A-8-257837, JP-A-8-294804, JP-T-9-502396, and JP-T-2001-514089 are provided with convex protrusions projecting on the rake face as chip breaker.

These thread cutting inserts are generally used to cut a thread on a circumferential surface of a rotative work through a lathe turning of a plurality of cycles. That is, as viewed in the plane, the insert body is held on the tool body so that a bisector of a V-shaped projection formed by the pair of thread cutting edges as viewed in the plane is orthogonal to a rotation axis of the work. Then, while cutting into the circumferential surface of the work, a corresponding thread cutting edge is fed in plural cycles (plural times) by a predetermined feed per revolution in the predetermined direction parallel to the axis. In this case, threads having desired cross-sectional shape and root depth are obtained by gradually increasing amount of cutting for every cycle.

As described above, when cutting amount gradually increases for every cycle, radial infeed, flank infeed, or incremental infeed is employed as a cutting method. In the radial infeed, cutting amount increases so that the insert body is advanced along the bisector in each of the cycles. In the flank infeed, cutting amount increases so that the insert body is advanced to the front side of the feeding direction along the thread cutting edge provided on the rear side of the feeding direction of the pair of thread cutting edges. In the incremental infeed, cutting amount increases so that the insert body is alternatively advanced and retreated to the front and rear sides of the feeding direction with the bisector therebetween. Furthermore, in general, the radial infeed tends to be used for distributed thread cutting due to the versatility of the NC program of a machine tool.

In the radial infeed, since increase of the cutting amount is relatively large in the cycle between the anterior cycles in which cutting begins and the midterm cycles, among the plural cycles, a cutting chip produced in the radial infeed has a relatively thick thickness. Consequently, the cutting chip can be handled by curling thereof or by the convex protrusions disclosed in JP-A-8-257837, JP-A-8-294804, JP-T-9-502396, and JP-T-2001-514089. However, since increase of the cutting amount is relatively small in the last cycle of posterior cycles in which a thread is formed in a predetermined dimension and shape, a cutting chip has an extremely thin thickness. Consequently, a cutting chip, which is hardly curled and thus tends to extend, is produced in the posterior cycles including the last cycle, and the cutting chip is produced over the entire length of the pair of thread cutting edges.

Since the insert disclosed in JP-A-8-257837, JP-A-8-294804, JP-T-9-502396, and JP-T-2001-514089 has the convex protrusions for curling the cutting chip on the inside of the thread cutting edges formed in a V-shaped projection as viewed in the plane, it is effective to handle the relatively thick cutting chip between the anterior cycles in which cutting begins and the midterm cycles. However, the extremely thin cutting chip produced in the posterior cycles or in the last cycle is flown out at a speed to be cut from the work without resistance against the rake face. Accordingly, the cutting chip is flown out so as to easily pass over the convex protrusions and so as to extend. For this reason, it is not possible to control the discharge direction of the cutting chip, whereby the work with the thread formed in a predetermined dimension and shape is damaged or the cutting chip is entangled onto the work or the tool body.

In addition, among JP-A-8-257837, JP-A-8-294804, JP-T-9-502396, and JP-T-2001-514089, in particular, JP-A-8-257837 discloses an insert in which the convex protrusions is not provided on the rake face of the inside of the thread cutting edges and inclined surfaces forming saw-like unevennesses are provided on the rear side of the thread cutting edges. However, since the inclined surfaces are formed in one stage shape rising from the rake face to a boss surface, the inclined surfaces must have a high height to reliably curl the cutting chip produced in the posterior cycles by colliding against the inclined surfaces. In this case, since the cutting chip can be curled at one time and change the outflow direction, cutting resistance is caused to increase. Consequently, there is a possibility that chattering vibration is generated on the work or the tool body, or accuracy of the finished surface deteriorates.

SUMMARY OF THE INVENTION

The invention has been made to solve the above-mentioned problems, and it is an object of the invention to provide a thread cutting insert that can reliably curl a cutting chip and thus control the discharge direction thereof without deterioration of a finished surface due to chattering vibration caused by increase of cutting resistance even in the posterior cycles of the radial infeed having difficulty in handling a cutting chip.

In order to achieve the object, according to an aspect of the invention, a thread cutting insert includes main cutting edges that have a pair of thread cutting edges and wiper thread cutting edges for full profile on side edges of a rake face formed on the insert body respectively. The pair of thread cutting edges is formed in a convex V shape as viewed in a plane facing the rake face and the wiper thread cutting edges for full profile are connected to a posterior end of at least one of the thread cutting edges. An inner portion of the V-shaped projection of the rake face, which is formed on the front side of the wiper thread cutting edge for full profile by the pair of thread cutting edges, is formed not to protrude from the thread cutting edges as viewed in the plane. Further, a first convex protrusion projecting from the rake face, a second convex protrusion higher than the first convex protrusion, and the third convex protrusions higher than the first and second convex protrusions project on the rear side of the wiper thread cutting edge for full profile of the rake face as viewed in the plane. Furthermore, the first and second convex protrusions are positioned closer to the main cutting edge than the third convex protrusions.

DESCRIPTION OF THE PREFERRED EMBODIMENTS

Figure 1:
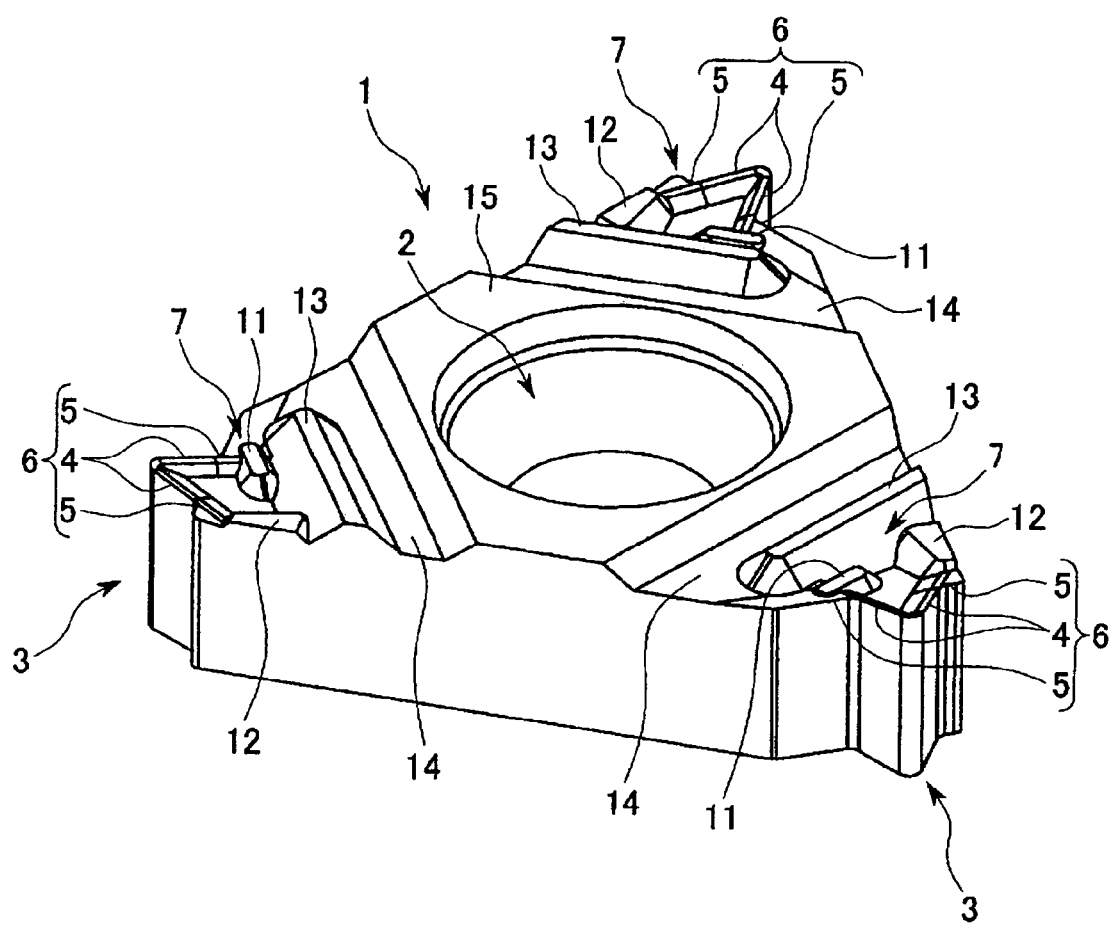
FIG. 1 is a perspective view showing a thread cutting insert according to an embodiment of the invention.
Figure 2:
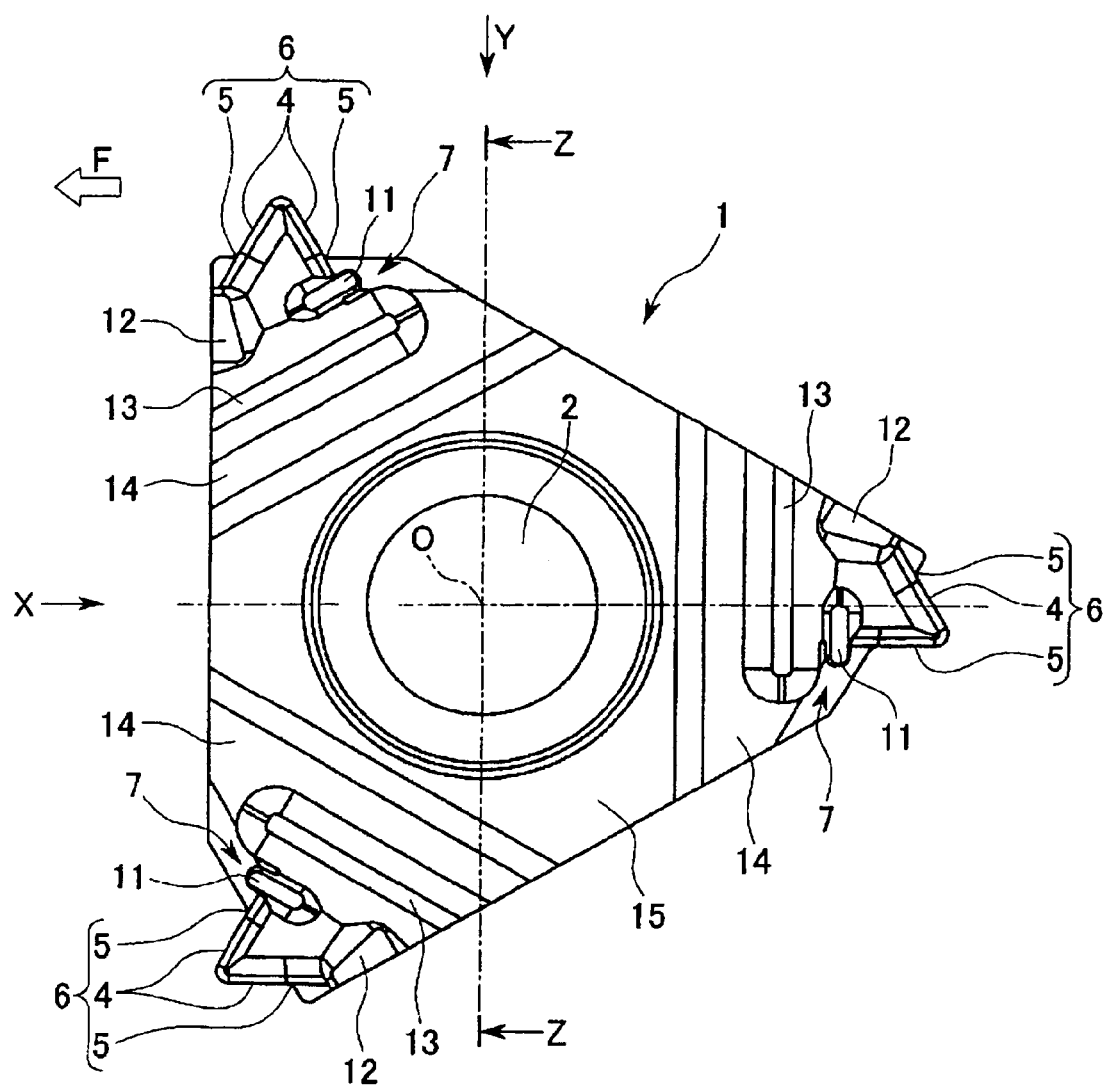
FIG. 2 is a plan view taken along a central line O of the thread cutting insert according to the embodiment shown in FIG. 1.
Figure 6:
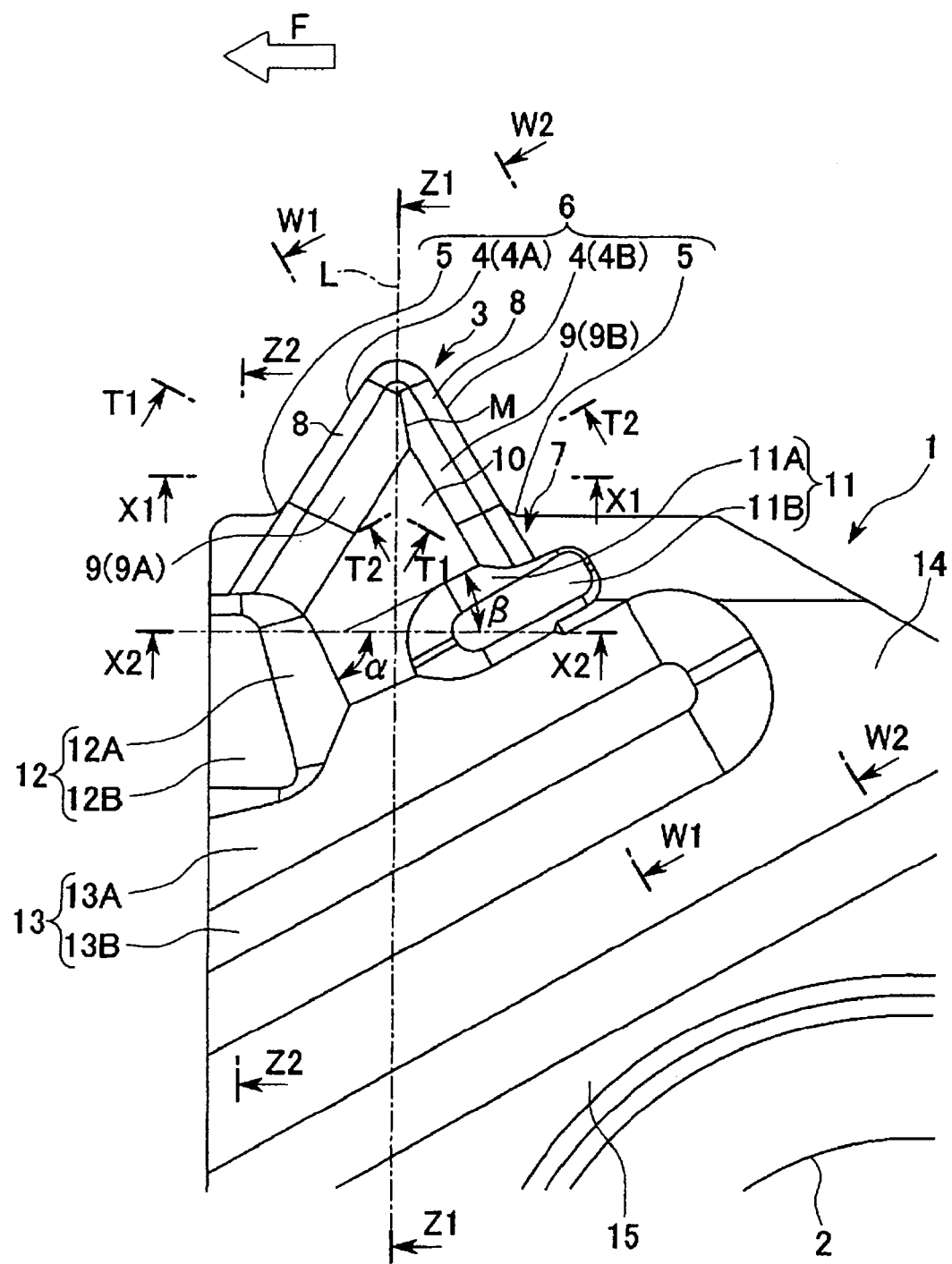
FIG. 6 is an enlarged plan view showing a corner portion of an insert body 1 of the embodiment shown in FIG. 1.

FIGS. 1 to 14 show a thread cutting insert according to an embodiment of the invention. In the present embodiment, an insert body 1 is made of hard material such as hard metal so as to be formed in a flat plate-shape of a substantially regular triangle, and a mounting hole 2 having a circular cross-section is provided at the center of the upper and lower surfaces of the insert body formed in the substantially regular triangular shape so as to pass through the insert body 1 in the thickness direction thereof (upward and downward direction in FIG. 1 and FIGS. 3 to 5, which is, hereinafter, referred to as a thickness direction of the insert). Consequently, the insert body 1 is rotationally symmetrical about a central line O of the mounting hole 2 at an interval of 120°. In addition, when viewed in a plan view taken along the central line O, each of corner portions of the insert body 1 formed in the regular triangular shape is cut out so as to be perpendicular to one of side edges intersecting at each of the corner portions as shown in FIG. 2. Furthermore, as shown in FIG. 6, when viewed in the plan view, each of V-shaped projections 3 protrudes from a notch surface of each notched portion at each of the corner portions to have a bisector L which is close to one side edge and is perpendicular to the notch surface of each notched portion, and extends in the thickness direction of the insert.

As viewed in the plan view, both side edges on the upper side of each of the V-shaped projections 3 are provided with a pair of thread cutting edges 4, respectively. In addition, as viewed in the plan view, wiper thread cutting edges 5 for full profile are provided on the side edges from the posterior ends of the thread cutting edges 4 above the notch surface perpendicular to the bisector L, respectively, so that each of the wiper thread cutting edges 5 for full profile is connected to the posterior end of each thread cutting edges 4. In this case, each of main cutting edges 6 is composed of the thread cutting edges 4 and the wiper thread cutting edges 5 for full profile, and each of the corner portions on the upper surface of the insert body 1, which includes the main cutting edge 6 on the side edge of the protrusion, serves as a rake face 7 of the insert body. However, the wiper thread cutting edge 5 for full profile may be connected to the only posterior end of the thread cutting edge 4, which is provided on the rear side of the insert feeding direction F to be described below, of the pair of thread cutting edges 4. Further, as viewed in the plan view, an angle between the thread cutting edges 4 formed in a convex V shape is set to be an acute angle, and the convex V-shaped tip where the thread cutting edges 4 intersect is formed in a convex circular arc shape that is smoothly connected to the thread cutting edges 4 and has a center on the bisector L. Meanwhile, an intersecting portion between the thread cutting edge 4 and the wiper thread cutting edge 5 for full profile connected to the posterior end thereof is formed in a concave circular arc shape that is smoothly connected to the thread cutting edge 4 and the wiper thread cutting edge 5 for full profile as viewed in the plan view. However, a radius of the concave and convex circular arc, a size of the angle between the thread cutting edges 4 formed in a convex V shape as viewed in the plan view, a length of the thread cutting edge 4 protruding from the wiper thread cutting edge 5 for full profile, and the like are set according to a dimension, shape, and the like of a thread to be formed on a work. Here, the thread cutting insert according to the present embodiment is detachably mounted on a tool body, such as a detachable insert type thread cutting bite, by use of a clamping screw (not shown) to be inserted into the mounting hole 2. In this case, the rake face 7 faces the work in the rotational direction thereof in a state that the bisector L is perpendicular to the rotational axis of the work (not shown) as viewed in the plan view. Furthermore, among side edges forming the regular triangular shape of the insert body 1, a side surface of the insert body 1, which is connected to the rest of two side edges other than one of the side edges intersecting at the corner portion having main cutting edges 6 used for thread cutting, comes in contact with a mounting position provided at the tip of the tool body. Then, while the insert is fed parallel to the rotational axis of the work through a plurality of cycles to the one side edge by the relation of clamp rigidity on the tool body with the insert mounted as described above, thread is formed on the circumferential surface of the work by using the thread cutting edges 4 and by increasing cutting amount for each of the cycles. In addition, apexes of thread ridges are formed by the wiper thread cutting edges 5 for full profile in the last cycle. Consequently, in the present embodiment, the direction (direction from right to left in FIGS. 2 and 6), which faces the one side edge and is perpendicular to the bisector L, becomes the insert feeding direction F.

Figure 3:
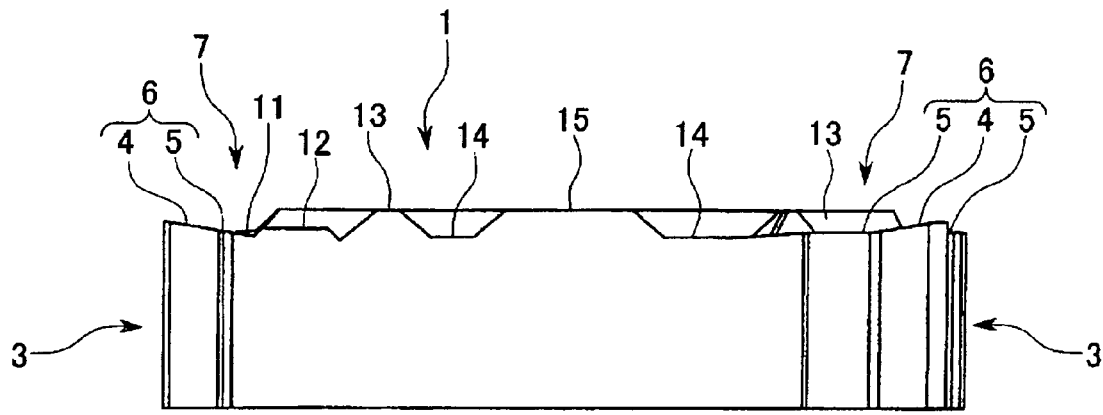
FIG. 3 is a side view showing the thread cutting insert as viewed in the X direction of FIG. 2.

Furthermore, as shown in FIG. 3, in the side view as viewed in the direction orthogonal to the bisector L, each of the thread cutting edges 4 is formed to be gradually recessed in the thickness direction of the insert and thus has a constant oblique angle from the tip to the rear side (direction from above to below in FIG. 6) of each of the rake faces 7 in the direction of the bisector L. In addition, each of the rake faces 7 connected to the wiper thread cutting edges 5 for full profile is also formed to be gradually recessed in the thickness direction of the insert and thus has the same constant oblique angle as the constant oblique angle formed by each of the thread cutting edges 4 in the side view toward the rear side of each rake face 7 in the direction of the bisector L, that is, in the direction perpendicular to each of the wiper thread cutting edge 5 for full profile as viewed in the plan view. Moreover, one side surface of each protrusion 3 formed by flanks of the thread cutting edges 4, the notch surfaces formed by flanks of the wiper thread cutting edges 5 for full profile, and the other side surface of the insert body 1 are formed to extend parallel to the thickness direction of the insert. Accordingly, the thread cutting insert according to the present embodiment becomes a negative insert, and the lower surface of the insert body 1 opposite to the upper surface thereof on which the thread cutting edges 4 or the wiper thread cutting edges 5 for full profile and the rake faces 7 are formed is formed as a flat surface perpendicular to the thickness direction of the insert.

Figure 8:
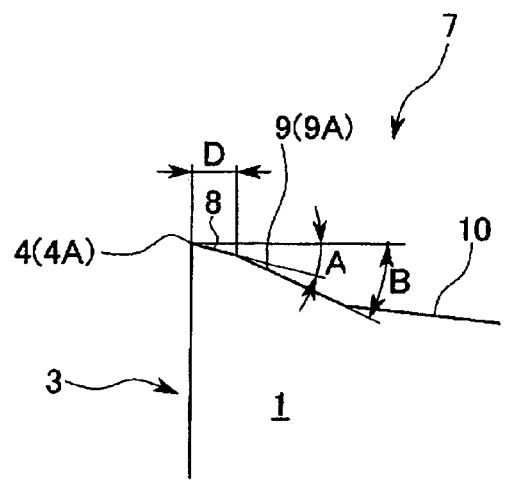
FIG. 8 is a cross-sectional view taken along a line T1—T1 of FIG. 6.
Figure 9:
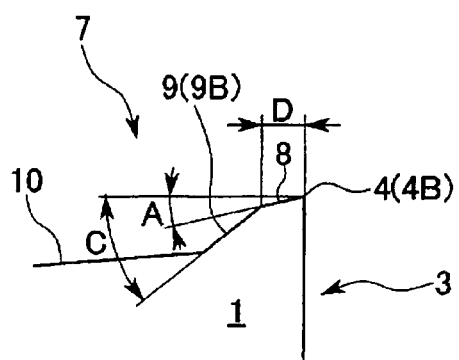
FIG. 9 is a cross-sectional view taken along a line T2—T2 of FIG. 6.

Further, as shown in FIGS. 8 and 9, in the cross-section orthogonal to each of the thread cutting edges 4, each of land portions 8 having a predetermined width D is formed on each of the inner portions of the convex V-shaped rake faces 7 formed by a pair of thread cutting edges 4 in the plan view so as to be gradually recessed in the thickness direction of the insert and thus has a constant oblique angle A as stayed away from each of the thread cutting edges 4. Each of inclined surfaces 9 gradually recessed in the thickness direction of the insert is formed on further inside of each land portion 8 so as to be gradually recessed in the thickness direction of the insert and thus has a constant oblique angle larger than the angle A of each land portion 8 toward the inside of each rake face 7. However, each of the inclined surfaces 9 is formed so that an oblique angle C of an inclined surface 9B connected to the thread cutting edge 4B (right thread cutting edge 4 in FIG. 6) on the rear side of the insert feeding direction F through the land portion 8 is larger than an oblique angle B of an inclined surface 9A connected to the inside of the thread cutting edge 4A (left thread cutting edge 4 in FIG. 6) on the front side of the insert feeding direction F through the land portion 8, that is, so that the inclined surface 9B is inclined more steeply than the inclined surface 9A. Consequently, a cross edge line (root line of a root formed by the inclined surfaces 9A and 9B) M between the inclined surfaces 9A and 9B extending from the convex V-shaped tip toward the rear side of each rake face 7 through each of the land portions 8 is inclined to gradually stay away from the bisector L to the rear side of the insert feeding direction F toward the inside of each rake face 7.

Figure 7:
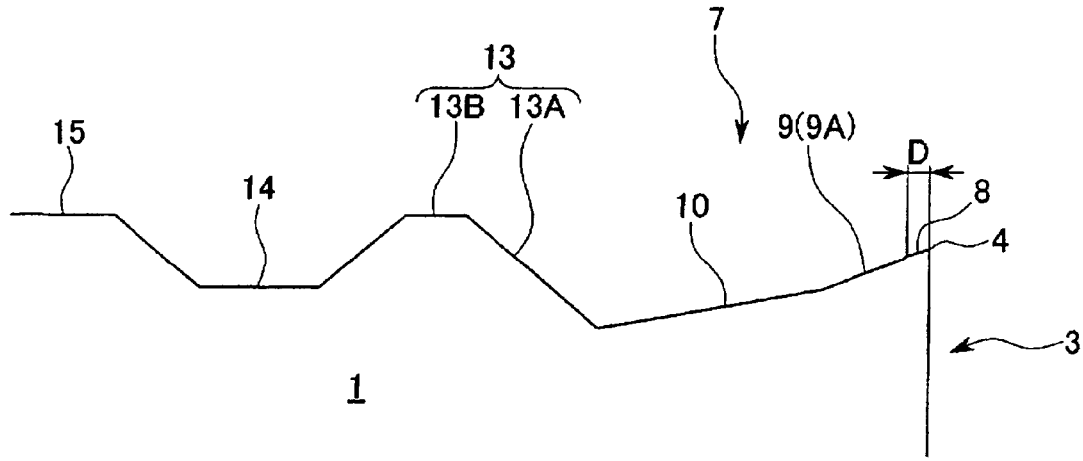
FIG. 7 is a cross-sectional view taken along a line Z1—Z1 of FIG. 6.
Figure 10:
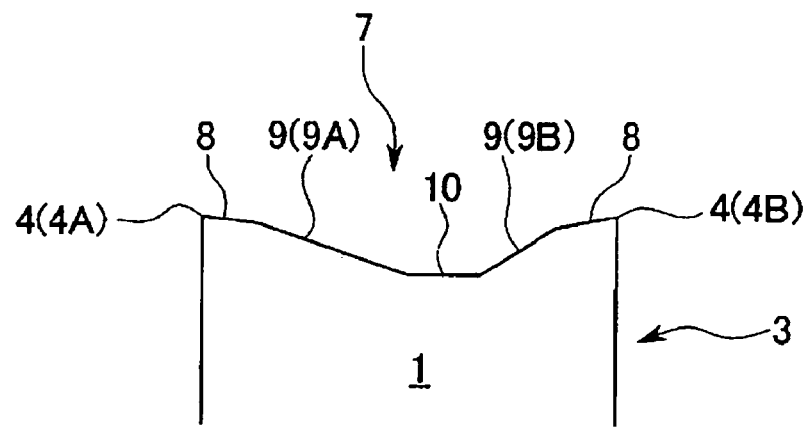
FIG. 10 is a cross-sectional view taken along a line X1—X1 of FIG. 6.
Figure 13:
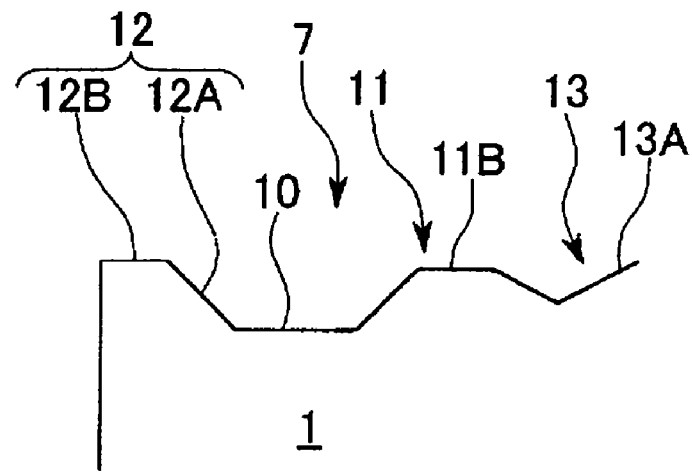
FIG. 13 is a cross-sectional view taken along a line X2—X2 of FIG. 6.
Figure 14:
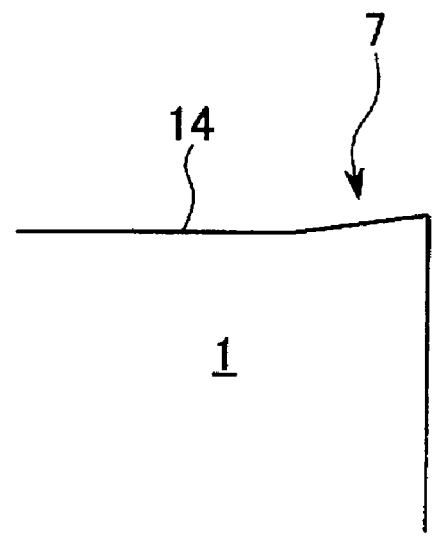
FIG. 14 is a cross-sectional view taken along a line W2—W2 of FIG. 6.

Moreover, a bottom surface 10 is formed on the inside of each inclined surface 9. The bottom surface 10 is perpendicular to the thickness direction of the insert in a cross-section orthogonal to the bisector L as shown in FIGS. 10 and 13, and is gradually recessed with an oblique angle equal to an oblique angle formed by a corresponding thread cutting edge 4 in the side view from the convex V-shaped tip toward the rear side thereof as shown in FIG. 7. Accordingly, the width of each inclined surface 9 from each land portion 8 to the bottom surface 10 is constant at any position of the inclined surfaces 9A and 9B, and a width of the inclined surface 9A with a gradual oblique angle is wider than that of the steeply inclined surface 9B with an oblique angle C between the inclined surfaces 9A and 9B. As viewed in the plan view, the land portions 8, the inclined surfaces 9, and the bottom surfaces 10 are formed to extend in the direction of the bisector L over the position of each wiper thread cutting edge 5 for full profile to the inner portion of each rake face 7 formed on the rear side thereof. Therefore, among the rake faces 7, the inner portion of the convex V-shaped rake face 7, which is formed by the pair of thread cutting edges 4 in the plan view and is formed on the front side of the wiper thread cutting edge 5 for full profile, is formed to be recessed from the thread cutting edges 4 as Shown in FIGS. 8 to 10 without protruding form the thread cutting edges 4 in the thickness direction of the insert.

Three convex protrusion, that is, a first convex protrusion 11, a second convex protrusion 12, and a third convex protrusion 13 are formed on the rake face 7 provided on the rear side of the wiper thread cutting edge 5 for full profile as viewed in the plan view, and convex protrusion heights of the projections 11 to 13 in the thickness direction of the insert are higher in order of the first convex protrusion 11, the second convex protrusion 12, and the third convex protrusion 13. Furthermore, the first convex protrusion 11 and the second convex protrusion 12 are positioned closer to the main cutting edge 6 than the third convex protrusion 13. As described above, in the present embodiment, the first convex protrusion 11 and the second convex protrusion 12 positioned closer to the main cutting edge 6 than the third convex protrusion 13 project on both sides of the bisector L, respectively, with a space therebetween in the plan view so that the first convex protrusion 11 having a lower height is positioned on the rear side of the bisector L in the insert feeding direction F and the second convex protrusion 12 having a higher height is positioned on the front side of the bisector L in the insert feeding direction F. In addition, as viewed in the plan view, the first convex protrusion 11 is positioned closer to the main cutting edge 6 than the second convex protrusion 12 in the direction of the bisector L.

Here, the first convex protrusion 11 is formed like a jetty that has an elliptical truncated cone shape and extends to face the main cutting edge 6 provided on the front side of the insert feeding direction toward the rear side of the insert feeding direction F in the direction perpendicular to the bisector L as viewed in the plan view. In particular, in the present embodiment, the first convex protrusion extends orthogonal to the thread cutting edge 4B on the rear side of the insert feeding direction F as viewed in the plan view. Consequently, a breaker wall (first breaker wall) 11A of the first convex protrusion 11 facing the main cutting edge 6 also extends to be inclined to the main cutting edge 6 toward the rear side of the insert feeding direction F in the direction perpendicular to the bisector L as viewed in the plan view.

Figure 11:
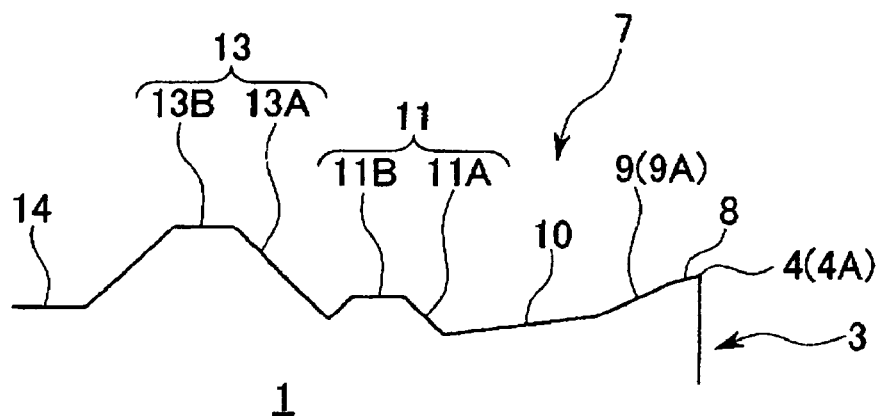
FIG. 11 is a cross-sectional view taken along a line W1—W1 of FIG. 6.

In addition, as shown in FIG. 6, the first breaker wall 11A is formed across the land portion 8 and the inclined surface 9B, which are connected to the thread cutting edge 4B to extend to the inside of the rake face 7 compared to the wiper thread cutting edge 5 for full profile, and the rake face 7 which is connected to the bottom surface 10 formed on the inside thereof and the wiper thread cutting edge 5 for full profile. Accordingly, the first breaker wall 11A is provided to further extend to the rear side of the insert feeding direction F in the direction perpendicular to the bisector L compared to the rear end of the thread cutting edge 4B formed on the rear side of the insert feeding direction F. Furthermore, the upper end face 11B of the first convex protrusion 11 is formed with a flat surface perpendicular to the thickness direction of the insert. In this case, the upper end face 11B has a projection height that is lower than the height of the tip of the thread cutting edge 4 in the thickness direction of the insert as shown in FIG. 3 or 11 and is higher than the rake face 7, the land portion 8, the inclined surface 9B, and the bottom surface 10 at the portion intersected with the land portion 8, the inclined surface 9B, the rake face 7, or the bottom surface 10.

Further, the second convex protrusion 12 is formed like a truncated pyramid that has a trapezoid shape with an upper base and a lower base extending in the direction perpendicular to the bisector L as viewed in the plan view. Furthermore, the second convex protrusion 12 has a second breaker wall 12B that extends to be inclined to the main cutting edge 6 toward the front side of the insert feeding direction F in the direction perpendicular to the bisector L. The second breaker wall 12A protrudes across the bottom surface 10 extending to the inside of the rake face 7 as shown in FIG. 6, and is formed on the opposite side to the first convex protrusion 11 with respect to the bisector L. In particular, in the present embodiment, as viewed in the plan view, the second breaker wall 12A is formed to be orthogonal to the extension direction of the elliptical truncated cone shape formed by the first convex protrusion 11, that is, to extend substantially parallel to the thread cutting edge 4B formed on the rear side of the insert feeding direction F. An angle α between the second breaker wall 12A and the direction perpendicular to the bisector L is larger than an angle β between the first breaker wall 11A and the direction perpendicular to the bisector L.

Figure 12:
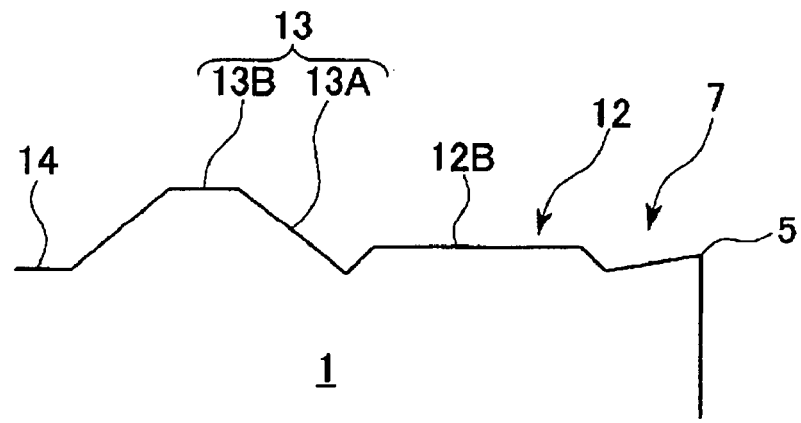
FIG. 12 is a cross-sectional view taken along a line Z2—Z2 of FIG. 6.

In addition, on the front side of the second breaker wall 12A, the second projection 12 is formed across the land portion 8 and the inclined surface 9B, which are connected to the thread cutting edge 4A formed on the front side of the insert feeding direction F to extend to the inside of the rake face 7 formed on the rear side of the wiper thread cutting edge 5 for full profile, and the rake face 7 which extends from the wiper thread cutting edge 5 for full profile connected to the rear end of the thread cutting edge 4A. Furthermore, on the opposite side of the second breaker wall 12A, the second convex protrusion 12 is formed to extend in the thickness direction of the insert and to be flush with the side surface of the insert body 1 which is connected to one side edge of the insert body 1 with the substantially regular triangle shape in the plan view. Accordingly, the second convex protrusion 12 is provided to further extend to the front side of the insert feeding direction F compared to the rear end of the thread cutting edge 4A formed on the front side of the insert feeding direction F. Furthermore, the upper end face 12B of the second convex protrusion 12 is formed with a flat surface perpendicular to the thickness direction of the insert. In this case, similarly to the first convex protrusion 11, the upper end face 12B also has a projection height that is lower than the height of the tip of the thread cutting edge 4 and is substantially equal to the height of the wiper thread cutting edge 5 for full profile connected to the rear end of the thread cutting edge 4 as shown in FIG. 3 or 12.

Furthermore, the third convex protrusion 13 is formed like a jetty of an elliptical truncated cone shape that is larger than the first convex protrusion 11 and extends substantially parallel to the first convex protrusion 11 as viewed in the plan view. Consequently, an angle between a third breaker wall 13A facing the main cutting edge 6 of the third convex protrusion 13 and the direction perpendicular to the bisector L is substantially equal to the angle β between the first breaker wall 11A and the direction perpendicular to the bisector L. However, similarly to the second projection 12, the front side of the third convex protrusion 13 in the insert feeding direction F is notched in the thickness direction of the insert and is flush with the side surface of the insert body 1 k which is connected to one side edge of the insert body 1 with the substantially regular triangle shape in the plan view. Moreover, the third breaker wall 13A crosses the walls opposite to the rear end of the bottom surface 10, the rear side of the second breaker wall 12A of the second convex protrusion 12, and the main cutting edges 6 of the first and the second convex protrusions 11 and 12, and thus protrudes to have a root with a concave V-shaped cross-section between the walls and itself as shown in FIG. 11 or 12.

Figure 4:
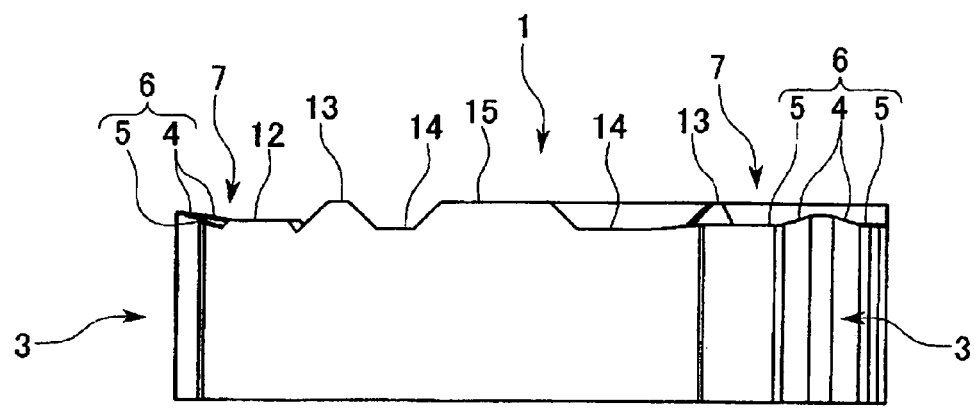
FIG. 4 is a side view showing the thread cutting insert as viewed in the Y direction of FIG. 2.
Figure 5:
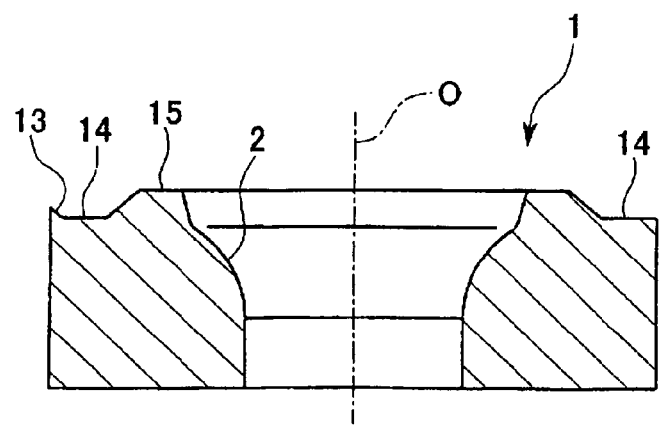
FIG. 5 is a cross-sectional view taken along a line Z—Z of FIG. 2.

In addition, compared to the first convex protrusion 11, the third convex protrusion 13 further extends to the rear side of the insert feeding direction F in the direction perpendicular to the bisector L as viewed in the plan view. Accordingly, the third breaker wall 13A is formed to have a length exceeding both rear ends of the pair of thread cutting edges 4 in the direction perpendicular to the bisector L as viewed in the plan view. Furthermore, similarly to the upper end faces 12B and 13B of the first and the second convex protrusions 11 and 12, the upper end face 13B of the third convex protrusion 13 is also formed with a flat surface perpendicular to the thickness direction of the insert. In this case, the upper end face 13B also has a projection height that is lower than the height of the tip of the thread cutting edge 4, and a projection height difference between the second highest second convex protrusion 12 and the third convex protrusion 13 becomes sufficiently larger than that between the first and the second convex protrusion 11 and 12. Further, as shown in FIG. 3 or 4, the upper end face 13B has the highest projection height on the insert body 1.

A flat surface portion 14 perpendicular to the thickness direction of the insert is formed on the rear side of the rake face 7, which is inclined to be recessed from the wiper thread cutting edge 5 for full profile toward the rear side thereof. A part of a conical wall formed on the rear side of the third convex protrusion 13 in insert feeding direction F and a wall facing opposite to the main cutting edge 6 protrude from the flat surface portion 14. Moreover, a boss surface 15, which has a projection height substantially equal to the projection height of the upper end face 13B of the third convex protrusion 13 and is perpendicular to the thickness direction of the insert, is formed at the periphery of the mounting hole 2 on the upper surface of the insert body 1 so as to have a space between the third convex protrusion 13 and the mounting hole 2 on the further rear side of the third convex protrusion 13 with.

The above-mentioned thread cutting insert is configured so that all of the first, the second, and the third convex protrusion 11, 12, and 13 projecting from the rake face 7 are positioned on the rear side of the wiper thread cutting edge 5 for full profile connected to the rear end of the thread cutting edges 4, and there is no portion protruding from the thread cutting edges 4 in the thickness direction of the insert. Therefore, although extremely thin cutting chip is produced in the late cycle, in particular, in the last cycle by using the insert in thread cutting through radial infeed, the cutting chip collides against the convex protrusion 11 to 13 after receiving the resistance to be grazed by the rake face 7 in the inside of the convex V-shape. For this reason, it is possible to reliably curl the cutting chip by causing the cutting chip to collide against the breaker walls 11A to 13A facing the main cutting edge 6 of the convex protrusions 11 to 13 so that the cutting chip dose not easily pass over at a speed producing the cutting chip similarly to a case of providing convex protrusions on the convex V-shape.

The first and the second convex protrusions 11 and 12 having lower projection heights among the convex protrusions 11 to 13 are positioned closer to the main cutting edge 6 than the third convex protrusion 13 having the highest height. Accordingly, the cutting chip grazed by the rake face 7, which is formed in the inside of the V-shaped projection formed by the thread cutting edges 4 as described above, first collides against the first and the second convex protrusions 11 and 12 having lower projection heights to be gradually curled, and are guided so that the outflow direction of the cutting chip faces a predetermined discharge direction. After that, the cutting chip curled as described above collides against the third convex protrusion 13. For this reason, the cutting chip is curled with a predetermined diameter and is discharged in the discharge direction. Accordingly, cutting resistance does not increase as in the case of curling the cutting chip at one time and changing the direction thereof into the discharge direction, thereby not causing an accuracy of the finished surface to deteriorate by chattering vibration generated on the work or the tool body.

According to the thread cutting insert having the above-mentioned structure, even in the case of the last cycle of the radial infeed, the cutting chip is reliably curled and then handled by controlling the discharge direction thereof. Therefore, it is possible to prevent the thread cutting from being ceased by entanglement of the cutting chip onto the work or the tool body, and to prevent an accuracy of a finished surface from deteriorating through a damage of the thread formed on the work by the cutting chip. For this reason, the thread cutting can be stably and smoothly performed to obtain a finished surface with an excellent accuracy. Furthermore, since relatively thick cutting chip produced through the anterior cycles of the radial infeed is easily curled only by grazing the rake face 7 which is formed in the inside of the V-shaped projection, it does not cause trouble with the handling thereof. Therefore, according to the above-mentioned insert, it is possible to stably handle the cutting chip during the whole thread cutting. In addition, in the present embodiment, the first and the second convex protrusions 11 and 12 against which the cutting chip first collides as described above project on both sides of the bisector L of the V-shaped projection formed by the pair of thread cutting edges 4 in the plan view, respectively. In particular, the cutting chip, which is flown out along the bisector L in case of the radial infeed, is caused to reliably collide against both the first and the second convex protrusions 11 and 12 so that the cutting chip is curled. Further, it is possible to lead the cutting chip to the third convex protrusion 13 by reliably guiding the cutting chip from the first convex protrusion 11 having a lower height to the second convex protrusion 12 and by gradually changing the outflow direction thereof. In addition, in the present embodiment, since the first convex protrusion 11 is positioned closer to the main cutting edge 6 than the second convex protrusion 12, curling of the cutting chip gradually becomes strong and the outflow direction is gradually changed. For this reason, it is possible to further reduce cutting resistance.

Furthermore, the first and the second convex protrusions 11 and 12 are formed on both sides of the bisector L, respectively, with a space therebetween. Therefore, when the cutting chip collides against the breaker walls 11A to 13A, the grazed area of the cutting chip on the rake face can be reduced, whereby it is possible to further reduce cutting resistance. For this reason, it is possible to more reliably prevent the generation of the chattering vibration. Moreover, as described above, since the first and the second convex protrusions 11 and 12 are positioned with a space therebetween, the cutting chip is flown out to the third convex protrusion 13 through a recessed portion formed between the first and the second convex protrusions 11 and 12. For this reason, it is possible to easily and reliably control the outflow direction of the cutting chip. However, when cutting resistance does not increase, the first and the second convex protrusions 11 and 12 may be connected to each other without a space therebetween.

Moreover, in the present embodiment, among the convex protrusions 11 and 12 projecting on both sides of the bisector L with a space therebetween, the first convex protrusion 11 having a lower projection height is formed on the rear side of the insert feeding direction F and the second convex protrusion 12 having a higher projection height is formed on the front side of the insert feeding direction F. Consequently, it is possible to curl and to discharge the cutting chip by leading it from the first convex protrusion 11 to the second convex protrusion 12, that is, to the front side of the insert feeding direction F. In this case, the cutting chip is easily discharged to the front side of the insert feeding direction F, and the discharge direction thereof can be more reliably controlled in the insert feeding direction F. In particular, it is possible to prevent the thread of the work, which is formed with a predetermined dimension and shape on the rear side of the thread cutting edge 4 in the insert feeding direction F through the last cycle, from being damaged.

Further, the first convex protrusion 11 projecting on the rear side of the insert feeding direction F is formed like a jetty that is forward inclined to the main cutting edge 6 toward the rear side of the insert feeding direction F perpendicularly to the bisector L as viewed in the plan view. For this reason, the first breaker wall 11A of the first convex protrusion 11 facing the main cutting edge 6 is also inclined to the main cutting edge 6 toward the rear side of the insert feeding direction F. Therefore, the cutting chip colliding against the first breaker wall 11A is led to the front side of the insert feeding direction F along the first breaker wall 11A. For this reason, according to the present embodiment, it is possible to strengthen the curling of the cutting chip by causing the curling of the cutting chip colliding against the first breaker wall 11A of the first convex protrusion 11 to more stably collide against the second convex protrusion 12 on the front side of the insert feeding direction F, and to more reliably turn the discharge direction thereof to the front side of the insert feeding direction F.

Meanwhile, the second convex protrusion 12 against which the cutting chip led from the first convex protrusion 11 collides includes the second breaker wall 12A that is forward inclined to the main cutting edge 6 toward the front side of the insert feeding direction F in the direction perpendicular to the bisector L as viewed in the plan view, contrary to the first breaker wall 11A. In particular, in the present embodiment, the second breaker wall 12A faces perpendicular to the direction extending from the first convex protrusion 11 or the first breaker wall 11A as viewed in the plan view. Accordingly, it is possible to more reliably strengthen the curling of the cutting chip and to more smoothly and stably curl the cutting chip by the third convex protrusion 13. In addition, as viewed in the plan view, the angle α between the second breaker wall 12A and the direction perpendicular to the bisector L is larger than an angle β between the first breaker wall 11A and the direction perpendicular to the bisector L. Therefore, excessive resistance does not occur by the cutting chip that is guided from the convex protrusion 11 and is flown out along the bisector L, which makes it possible to reliably prevent the generation of the chattering vibration.

Furthermore, the third convex protrusion 13, which projects on the rear side (opposite side to the main cutting edge 6) of the first and the second convex protrusions 11 and 12, is formed with a length exceeding both rear ends of the pair of thread cutting edges 4 connected to the wiper thread cutting edges 5 for full profile so that the front side of the third breaker wall 13A facing the main cutting edge 6 in the insert feeding direction F further extends to the front side of the insert feeding direction F and the rear side thereof further extends to the rear side of the insert feeding direction F. Accordingly, in particular, in the case of the posterior cycles of the radial infeed, it is possible to curl the cutting chip by causing the cutting chip produced over the entire length of the pair of thread cutting edges 4 to reliably collide against the third breaker wall 13A having a length larger than the width of the cutting chip, and to discharge the cutting chip by leading it to the rear side of the insert feeding direction F. In addition, in the present embodiment, the first and the second convex protrusions 11 and 12 also extend so that the breaker wall 11A and 12A pass over the both rear ends of the pair of thread cutting edges 4 to the rear and front sides of the insert feeding direction. Consequently, the handleability for handling the cutting chip by the first and the second convex protrusions 11 and 12 does not deteriorate in the last cycle of the radial infeed.

Moreover, in the present embodiment, as viewed in the plan view, the third convex protrusion 13 is formed like a jetty that extends to face the main cutting edge 6 toward the rear side of the insert feeding direction F at an angle equal to the angle β between the first convex protrusion 11 and the direction perpendicular to the bisector L. Accordingly, the cutting chip curled by colliding against the third breaker wall 13A of the third convex protrusion 13 is discharged to the front side of the insert feeding direction F along the third convex protrusion 13. For this reason, although the discharge direction of the cutting chip is controlled and the cutting chip is discharged, it is possible to prevent the work from being damaged. In addition, a recessed portion having a V-shaped cross-section is formed between the third breaker wall 13A and the wall facing the rear side of the second convex protrusion 12 so as to extend to the rear side opposite to the main cutting edge 6 toward the front side of the insert feeding direction F, that is, so as to stay away from the work. Further, the front side of the recessed portion in the insert feeding direction F is released on the side surface of one side edge of the insert body 1 facing the front side of the insert feeding direction F. Therefore, according to the present embodiment, it is possible to discharge the cutting chip curled with a predetermined diameter without interruption to the front side of the insert feeding direction F, that is, in the direction away from the work by leading it through the recessed portion.

However, in the present embodiment, as viewed in the plan view, the breaker walls 11A and 13A of the first and the third convex protrusions 11 and 13 are inclined to face the main cutting edge 6 toward the rear side of the insert feeding direction F at the angle β equal to each other with respect to the direction perpendicular to the bisector L. Then, the breaker wall 12A of the second convex protrusion 12 is inclined to face the main cutting edge 6 toward the front side of the insert feeding direction F at an angle larger than the angle β with respect to the direction perpendicular to the bisector L, in particular, at a substantially right angle as viewed in the plan view. However, angles of the breaker walls 11A and 13A may be different from each other, and the angle α of the breaker wall 12A may be equal to the angle β or be smaller than the angle β. The breaker walls may be not inclined to have angles α and β, that is, the angles α and β may be 0°. In other words, at least one of the breaker walls 11A to 13A of the first to the third convex protrusions 11 to 13 may extends in the direction perpendicular to the bisector L.

Furthermore, in the present embodiment, each of the first to the third convex protrusions 11 to 13 is formed in an elliptical shape as viewed in the plan view. Each of the breaker walls 11A and 13A protrudes so as to be inclined at a predetermined oblique angle, and is formed in an elliptical truncated cone shape that each of the upper end faces 11B and 13B thereof are formed flat surface perpendicular to the thickness direction of the insert. Further, the second convex protrusion 12 is also formed in a truncated pyramid that has a trapezoid shape as viewed in the plan view. However, the upper end faces 11B to 13B may be formed in a convex curved surface shape, each of the first and the third convex protrusions 11 and 13 may be formed in a convex curved surface shape that has a convex circular arc shaped cross-section as a whole, and the second convex protrusion 12 may be formed in a spherical shape. In addition, a recessed portion may be not formed between the rear sides of the first and second convex protrusions 11 and 12 and the breaker wall 13A of the third convex protrusion 13, for example, the upper end faces 11B and 12B may be formed to be connected to the breaker wall 13A.

Meanwhile, the land portions 8 and the inclined surfaces 9 are provided in the present embodiment. The land portions 8 are connected to the pair of thread cutting edges 4, respectively and gradually recessed toward the inside of the V-shaped projection. The inclined surfaces 9 are recessed more steeply than the land portions 8 toward the inside of the V-shaped projection. Furthermore, the land portions 8 and the inclined surfaces 9 extend to the rear side of the wiper thread cutting edges 5 for full profile to cross the first and second convex protrusions 11 and 12, respectively. Therefore, it is possible to reliably collide against the first and second projections 11 and 12 and the third convex protrusion 13 on the rear side thereof, and to further reduce cutting resistance by causing the cutting chip to be more reliably flown out along the bisector L.

In addition, in the present embodiment, among these inclined surfaces, the inclined surface 9B inclined to be recessed from the thread cutting edge 4B formed on the rear side of the insert feeding direction F is inclined more steeply than the inclined surface 9A inclined to be recessed from the thread cutting edge 4A formed on the front side of the insert feeding direction F. Accordingly, the cutting chip, which is produced by the thread cutting edge 4B formed on the rear side of the insert feeding direction F and is grazed by the inclined surface 9B to reach the bottom surface 10, has a grazed area or grazed distance grazed by the inclined surfaces 9 smaller than the cutting chip, which is produced by the thread cutting edge 4A formed on the front side of the insert feeding direction F and is grazed by the inclined surface, thereby consuming smaller kinetic energy and being pushed out to the front side of the insert feeding direction F.

For this reason, even when the thread cutting insert according to the present embodiment is used for a flank infeed other than the radial infeed, more cutting chips produced by the thread cutting edge 4A formed on the front side of the insert feeding direction F can be flown out along the bisector L as viewed in the plan view by first flowing a cutting chip, which is produced by the thread cutting edge 4A formed on the front side of the insert feeding direction F and has larger kinetic energy, to the bottom surface 10, and by pushing out the cutting chip to the front side of the insert feeding direction F. Accordingly, it is possible to provide a universal thread cutting insert that can reliably handle the cutting chip even in the case of being used for the flank infeed. On the other hand, the land portion formed on the front side of the insert feeding direction F has the same angle A and width D as the land portion formed on the rear side of the of the insert feeding direction F. Therefore, abrasion between the thread cutting edges 4A and 4B can be maintained uniformly for the cutting chip produced substantially uniformly on the both sides in case of the radial infeed, whereby it is possible to promote stable thread cutting for long periods.

In the thread cutting insert as described above, since an inner portion of the V-shaped projection of the rake face which is formed on the front side of the wiper thread cutting edge for full profile by the pair of thread cutting edges is formed not to protrude from the thread cutting edges as viewed in the plane, it is possible to handle an extremely thin cutting chip by reliably leading it to the first or the third convex protrusion. Meanwhile, since the convex protrusions formed on the rake face project on the rear side of the wiper thread cutting edge for full profile of the rake face, the cutting chip produced by the thread cutting edges collides against the convex protrusions at a position to which resistance to be grazed along the rake face of the V-shaped projection formed by the thread cutting edges as viewed in the plane is applied. For this reason, although the extremely thin cutting chip is produced in the posterior cycles of the radial infeed, it is possible to reliably curl the cutting chip by curling it by the convex protrusions and then to control the discharge direction thereof so that the cutting chip dose not easily pass over the convex protrusions at the speed producing the cutting chip. In addition, since a relatively thick cutting chip produced between the anterior cycles in which cutting begins and the midterm cycles is easily curled, the handleability for handling the cutting chip does not deteriorate.

Further, the convex protrusions are composed of three convex protrusions, that is, a first convex protrusion, a second convex protrusion, and a third convex protrusion, and projection heights thereof are higher in this order. Among the convex protrusion, the first and the second convex protrusions having lower heights are positioned closer to the main cutting edge 6 than the third convex protrusion having the highest height. Therefore, the cutting chip first collides against the first and the second convex protrusions so as to be gradually curled, and the outflow direction of the cutting chip can be guided to gradually turn into a predetermined by the height difference between the first and the second convex protrusions, whereby it is possible to suppress the increase of the resistance. Then, the cutting chip is curled with a predetermined diameter by colliding against the highest third convex protrusion and thus can be discharged in the discharge direction controlled as described above. For this reason, according to the insert having the above-mentioned structure, it is possible to prevent the cutting chip from being entangled onto the work or the tool body, and to prevent chattering vibration due to excessive resistance from being generated in the posterior cycles, particularly in the last cycle. Therefore, it is possible to promote stable thread cutting for finished surface with an excellent accuracy.

In the insert having the above-mentioned structure, the first and second convex protrusions positioned closer to the main cutting edge project on both sides of a bisector of the V-shaped projection formed by the pair of thread cutting edges as viewed in the plane, respectively. Consequently, the cutting chip, which is flown out along the bisector L in case of the radial infeed, is caused to more reliably collide against both the first and the second convex protrusions so that the cutting chip is curled and the outflow direction of the cutting chip can be guided to gradually turn into a predetermined direction. In the above-mentioned structure, the first and second convex protrusions project with a space therebetween. Accordingly, when the cutting chip collides against the first and the second convex protrusions to be grazed by the rake face, the grazed area of the cutting chip on the rake face can be reduced, whereby it is possible to further reduce cutting resistance.

Furthermore, as described above, when the first and second convex protrusions positioned closer to the main cutting edge project on both sides of a bisector, the first convex protrusion projects on the rear side of the insert body feeding direction (hereinafter, referred to as an insert feeding direction) with respect to the bisector as viewed in the plane, and the second convex protrusion projects on the front side of the insert feeding direction with respect to the bisector. Accordingly, the cutting chip, which is flown out along the bisector L, is guided from the first convex protrusion having a lower projection height to the second convex protrusion having a higher projection height. That is, since the cutting chip is guided to the front side of the insert feeding direction, it is possible to more reliably prevent the thread formed on the work from being damaged by the cutting chip.

Moreover, in the above-mentioned structure, since the first convex protrusion is provided with a first breaker wall that extends to be inclined to the main cutting edge toward the rear side of the insert feeding direction in the direction perpendicular to the bisector as viewed in the plane, it is possible to reliably guide the cutting chip to the front side of the insert feeding direction. Further, the second convex protrusion is provided with a second breaker wall that extends to be inclined to the main cutting edge toward the front side of the insert feeding direction in the direction perpendicular to the bisector as viewed in the plane. Consequently, it is possible to more reliably curl the cutting chip guided from the first convex protrusion.

Furthermore, in the above-mentioned structure, the third convex protrusion is provided with a third breaker wall that extends to have a length exceeding at least both rear ends of the pair of thread cutting edges in the direction perpendicular to the bisector L as viewed in the plane. Therefore, it is possible to reliably handle the cutting chip produced over the entire length of the pair of thread cutting edges. In addition, similar to the first breaker wall, the third breaker wall extends to be inclined to the main cutting edge toward the rear side of the insert feeding direction in the direction perpendicular to the bisector as viewed in the plane. Accordingly, it is possible to stably discharge the cutting chip curled by the third convex protrusion to the front side of the insert feeding direction, and thus to more reliably prevent the work from being damaged.

As described above, the radial infeed is a mainstream as a thread cutting method. However, when a thread pitch is large, the flank infeed capable of more easily handling a cutting chip may be employed in the cutting not following NC control to reduce cutting resistance. In the flank infeed, since the cutting chip is generally produced by the thread cutting edge formed on the front side of the insert feeding direction and is flown out to the rear side of the insert feeding direction, it is difficult to turn the discharge direction thereof into the front side of the insert feeding direction, and thus to handle the cutting chip by the first or the third convex protrusion, similarly to the radial infeed.

Meanwhile, in the above-mentioned structure, an inner portion of the V-shaped projection of the rake face, which is formed on the front side of the wiper thread cutting edge for full profile by the pair of thread cutting edges, is provided with inclined surfaces that are gradually recessed toward the inside with respect to the thread cutting edges, and an inclined surface of the inclined surfaces formed on the rear side of the insert body feeding direction is inclined more steeply than an inclined surface formed on the front side of the insert body feeding direction. Therefore, the cutting chip produced by the thread cutting edge formed on the rear side of the insert feeding direction can be promptly led to the bottom of the inclined surface so that the cutting chip has larger kinetic energy by reducing grazed resistance along the rake face on the rear side of the insert feeding direction. For this reason, it is possible to push out the cutting chip, which is produced by the thread cutting edge formed on the front side of the insert feeding direction, to the front side of the insert feeding direction. Accordingly, if employing the above-mentioned structure, it is possible to flow the cutting chip produced in the flank infeed along the bisector, and thus to handle it by the first or the third convex protrusion provided on the rear side of the thread cutting insert. Therefore, according to the invention, it is possible to a thread cutting insert capable of obtaining the excellent handleability for handling the cutting chip in the flank infeed as well as in the radial infeed.

The invention claimed is:

1. A thread cutting insert comprising:
   main cutting edges having a pair of thread cutting edges and wiper thread cutting edges for full profile on side edges of a rake face formed on the insert body respectively; the pair of thread cutting edges formed in a convex V shape as viewed in a plane facing the rake face; and the wiper thread cutting edges connected to a posterior end of at least one of the thread cutting edges,
   wherein an inner portion of the V-shaped projection of the rake face, which is formed on the front side of the wiper thread cutting edges for full profile by the pair of thread cutting edges, is formed not to protrude from the thread cutting edges as viewed in the plane;
   a first convex protrusion projecting from the rake face, a second convex protrusion higher than the first convex protrusion, and the third convex protrusion higher than the first and second convex protrusions project on the rear side of the wiper thread cutting edges for full profile of the rake face as viewed in the plane,
   wherein the first and second convex protrusion are positioned closer to the main cutting edge than the convex protrusion.

2. The thread cutting insert according to claim 1,
   wherein the first and second convex protrusions project on the both sides of a bisector of the V-shaped projection formed by the pair of thread cutting edges as viewed in the plane, respectively.

3. The thread cutting insert according to claim 2,
   wherein the first and second convex protrusions project with a space therebetween.

4. The thread cutting insert according to claim 2,
   wherein the first convex protrusion projects on the rear side of the insert body feeding direction with respect to the bisector as viewed in the plane, and the second convex protrusion projects on the front side of the insert feeding direction with respect to the bisector.

5. The thread cutting insert according to claim 4,
   wherein the first convex protrusion is provided with a first breaker wall that extends to be inclined to the main cutting edge toward the rear side of the insert body feeding direction in the direction perpendicular to the bisector as viewed in the plane.

6. The thread cutting insert according to claim 4,
   wherein the second convex protrusion is provided with a second breaker wall that extends to be inclined to the main cutting edge toward the front side of the insert body feeding direction in the direction perpendicular to the bisector as viewed in the plane.

7. The thread cutting insert according to claim 1,
   wherein the third convex protrusion is provided with a third breaker wall that extends to have a length exceeding at least both rear ends of the pair of thread cutting edges in the direction perpendicular to the bisector as viewed in the plane.

8. The thread cutting insert according to claim 7,
   wherein the third breaker wall extends to be inclined to the main cutting edge toward the rear side of the insert body feeding direction in the direction perpendicular to the bisector as viewed in the plane.

9. The thread cutting insert according to claim 1,
   wherein the inner portion of the V-shaped projection of the rake face, which is formed on the front side of the wiper thread cutting edges for full profile by the pair of thread cutting edges, is provided with inclined surfaces that are gradually recessed toward the inside with respect to the thread cutting edges, and an inclined surface of the inclined surfaces formed on the rear side of the insert body feeding direction is inclined more steeply than an inclined surface formed on the front side of the insert body feeding direction.

* * * * *